United States Patent [19]

Rostler

[11] 4,094,697
[45] June 13, 1978

[54] ASPHALT CEMENT AND CONCRETE COMPOSITIONS AND FILLER COMPOSITIONS THEREFOR

[75] Inventor: Fritz S. Rostler, Bakersfield, Calif.

[73] Assignee: Cabot Corporation, Boston, Mass.

[21] Appl. No.: 796,983

[22] Filed: May 16, 1977

Related U.S. Application Data

[63] Continuation-in-part of Ser. No. 696,926, Jun. 17, 1976, which is a continuation of Ser. No. 495,603, Aug. 8, 1974, abandoned, which is a continuation-in-part of Ser. No. 406,865, Oct. 16, 1973, abandoned.

[51] Int. Cl.$^2$ .......................... C08L 95/00; C09D 3/24
[52] U.S. Cl. ............................... 106/280; 106/281 N; 404/17; 404/32
[58] Field of Search ............... 106/275, 280, 281, 282, 106/283, 284, 307; 260/28, 28.5 AS; 404/17, 31, 32, 71; 427/138

[56] References Cited

U.S. PATENT DOCUMENTS

| | | | |
|---|---|---|---|
| 2,440,299 | 4/1948 | Rostler et al. | 260/36 |
| 2,635,057 | 4/1953 | Jordan | 106/307 |
| 2,699,381 | 1/1955 | King | 106/307 |
| 2,848,347 | 8/1958 | Rushford | 106/307 |
| 2,942,299 | 6/1960 | Larson | 106/307 X |
| 2,960,413 | 11/1960 | Voet | 106/307 |
| 3,005,725 | 10/1961 | Daniell | 106/307 |
| 3,123,487 | 3/1964 | Verdier | 106/281 X |
| 3,162,101 | 12/1964 | Rostler | 106/277 X |
| 3,235,483 | 2/1966 | McCoy et al. | 106/281 X |
| 3,239,361 | 3/1966 | Speer | 106/275 |
| 3,277,218 | 10/1966 | Dollinger | 264/40 |
| 3,282,719 | 11/1966 | Voet | 106/307 |
| 3,330,673 | 7/1967 | Henderson | 106/307 |
| 3,340,080 | 9/1967 | Voet et al. | 106/32 |
| 3,372,041 | 3/1968 | Dobbin et al. | 106/20 |
| 3,498,814 | 3/1970 | Voet et al. | 106/307 |
| 3,565,659 | 2/1971 | Dickerson | 106/307 |
| 3,567,475 | 3/1971 | Rostler | 106/278 |
| 3,776,750 | 12/1974 | Mills | 106/307 |
| 3,779,964 | 12/1963 | Gagle et al. | 260/28.5 |
| 3,852,399 | 12/1974 | Rothbuhr | 264/117 |
| 3,900,692 | 8/1975 | Rostler | 106/278 X |

OTHER PUBLICATIONS

Halstead et al., Properties of Highway Asphalts–Part III, Influence of Chemical Composition, in Public Roads, Pub. by Bureau of Pub. Roads, Dept. of Commerce, Washington, D. C., vol. 34, No. 2, Jun. 1966, pp. 17–29.

Kirk-Othmer, Encyclopedia of Chemical Technology, 2nd revised ed., N. Y., Interscience Encyclopedia Publishers, vol. 4, pp. 242–282. TPE68.C.

Martin; K. G., Preliminary Microviscometer Studies of Carbon Black/Rubber/Bitumen, in Australian Road Research Board Proceedings, 1962, vol. Part 2, pp. 895–911.

Rostler et al., Modification of Asphalt Cements for Improvement of Wear Resistance of Pavement Surfaces, in report No. FHWA-RD-72-74, Catalog No. PB-219406, Mar. 1972, pp. 16, 28–31, 34–35, 78–80, 82, 89, 90, 92, 105–108, 110–119, 122–123, 126–127.

Government Report Announcements, vol. 73, No. 15, Aug. 10, 1973.

*Primary Examiner*—Joan E. Welcome
*Attorney, Agent, or Firm*—Jack Schuman; Barry R. Blaker; Lawrence A. Chaletsky

[57] ABSTRACT

There are provided improved asphalt cements and bituminous paving compositions containing certain reinforcing filler compositions which impart desirable properties thereto. The filler compositions of the invention are asphalt-dispersible pellets comprising certain carbon blacks which have been treated with certain nonvolatile petroleum oils.

26 Claims, No Drawings

ASPHALT CEMENT AND CONCRETE COMPOSITIONS AND FILLER COMPOSITIONS THEREFOR

CROSS-REFERENCE

This application is a continuation-in-part of my copending application Ser. No. 696,926, filed Jun. 17, 1976, which application Ser. No. 697,926 is a continuation of my application Ser. No. 495,603, filed Aug. 8, 1974, now abandoned, and which application Ser. No. 495,603 is a continuation-in-part of my application Ser. No. 406,865, filed Oct. 16, 1973, now abandoned.

BACKGROUND OF THE INVENTION

Field of the invention: The present invention relates generally to asphalt cements and to asphalt or bituminous concrete paving compositions. More specifically, the present invention is concerned with the provision of novel reinforcing filler compositions for use in asphalt cements, which reinforcing filler compositions impart desirable properties to asphalt cements, per se, and to asphalt concretes formed therewith.

The prior art: In the 1962 Proceedings of the Australian Road Research Board, Vol. 1, Part 2, there appear separate reports by K. G. Martin (pages 895 ff) and A. G. Aliotti (pages 912 ff). The major premise upon which these reports were based resides in the authors' respective conceptualizations of benefits to be enjoyed by the use of rubber reinforcing grades of carbon black as additives in asphalt cements and concretes. Unfortunately, the experimental results of Martin's work, wherein there were employed rubber-grade carbon black pellets, led this author to the conclusion that the benefits he originally projected were either not forthcoming or existed to such a minor degree as to be of minor significance. Martin further concluded that the optimal amounts of carbon black to be employed were about 3 weight parts of carbon black on 100 weight parts of the asphalt cement. Attempts by Martin to use higher amounts of carbon black and to add higher amounts of fluxing oil separate from the carbon black resulted in the conclusion that "if an aromatic oil is used to facilitate dispersion, the fluxing effect of the oil on the bitumen more than offsets any advantages conferred by the carbon black." The Aliotti report merely provides a condensed review of the history, techniques of manufacture and properties of carbon black, the author speculating that incorporation of carbon black into asphalt cements should have some beneficial effects. However, Aliotti does not teach or suggest as to how to achieve the beneficial results; he merely submits that work should be encouraged by responsible authorities to conduct practical field tests.

In accordance with the present invention, there are now provided carbon black based reinforcing filler compositions which compositions impart profound and beneficial improvements in the properties of asphalt cements and in bituminous or asphalt concrete paving compositions formed therewith.

OBJECTS OF THE INVENTION

It is a principal object of the invention to provide novel reinforcing filler compositions for asphalt cements and concretes.

It is another object of the invention to provide improved asphalt cement compositions characterized by reduced temperature susceptibility and improved durability.

It is another object of the invention to provide improved asphalt or bituminous concrete compositions characterized by improved abrasion resistance.

It is another object of the invention to provide improved asphalt or bituminous concrete compositions characterized by improved toughness.

Other objects and advantages of the invention will in part be obvious and will in part appear hereinafter.

SUMMARY OF THE INVENTION

The improved asphalt cement compositions of the invention display substantially reduced pellet abrasion values over control compositions containing no reinforcing filler and comprise an asphalt cement having dispersed therein a pelleted reinforcing filler composition comprising a homogeneous mixture of carbon black having a BET-$N_2$ surface area of at least 40 $m^2/g$ and a DBP (dibutyl phthalate) absorption value of at least 60 cc/100 g and an asphalt miscible petroleum oil, which oil is essentially non-volatile at temperatures below about 325° F, said pelleted filler composition having a weight ratio of carbon black to oil of between 100 to 5 and 60 to 40, a residue value of not more than about 4 weight percent thereof and the quantity of said filler being sufficient to provide a carbon black concentration of between 10 and 70 parts per hundred parts by weight of said asphalt cement.

The improved asphalt concrete compositions of the invention comprise the improved asphalt cement compositions of the invention and, in addition, mineral aggregate.

The novel reinforcing filler composition of the invention is a pelleted homogeneous mixture comprising carbon black having a BET-$N_2$ surface area of at least 40 $m^2/g$ and a DBP absorption value of at least 60 cc/100 g and an asphalt miscible petroleum oil, said oil being essentially non-volatile at a temperature of below about 325° F, the pelleted filler composition having a weight ratio of carbon black to oil of between 90 to 10 and 60 to 40, a residue value of no more than about 4 weight percent thereof and being of a character such as to result in reduced pellet abrasion values of test asphalt compositions prepared and tested in accordance with the Pellet Abrasion Test procedure described hereinafter.

DETAILED DESCRIPTION OF THE INVENTION

The carbon blacks useful in formulating the pelleted reinforcing filler compositions of the invention have, as mentioned, surface areas of greater than about 40 $m^2/g$ as determined by the Brunauer-Emmett-Teller nitrogen adsorption technique and DBP absorption values of greater than about 60 cc/100 g as described by the procedure set forth in ASTM D 2414-72 and entitled, "Standard Method of Test for Dibutyl Phthalate Absorption Number of Carbon Black".

Analysis of the total surface area of a carbon black by use of the BET (Brunauer-Emmett-Teller) nitrogen adsorption isotherms thereof is well known. Complete details of the BET-$N_2$ analytical technique may be had by reference to an article appearing in the Journal of the American Chemical Society, Vol. 60, page 309 (1938). Preferred carbon blacks for use in the pelleted filler compositions of the invention will have BET-$N_2$ surface areas of at least about 70 $m^2/g$.

Briefly, DBP absorption values for carbon blacks are determined by mixing incremental amounts of dibutyl phthalate with a carbon black under test until there occurs a transition from a free-flowing powder to a semi-plastic agglomerate. For purposes of the present invention, the DBP absorption value is expressed as cubic centimeters (cc) of dibutyl phthalate (DPB) per 100 grams of carbon black. In a preferred embodiment of the invention, the carbon black component of the pelleted reinforcing filler composition will have a DBP absorption value of at least about 100 cc/100 g.

The particular method by which the carbon blacks employed in the pelleted filler compositions of the invention are produced is of little consequence provided, of course, that the carbon blacks meet the BET-$N_2$ surface area and dibutyl phthalate absorption values limitations forming part hereof. Accordingly, carbon blacks produced by the so-called channel, oil furnace, gas furnace, detonation, thermal plasma, arc and acetylene processes can all be found to be suitable. Further information concerning various of the industrial carbon black processes, of course, may be had by reference to the Kirk-Othmer Encyclopedia of Chemical Technology, 2nd Edition, Vol. 4, pages 243 to 282, Interscience Publishers, N. Y., 1964.

In contemplation of the various oils which can be employed in the pelleted reinforcing filler compositions of the invention, it is generally sufficient that said oil be a solvent for the asphalt cement and be essentially non-volatile at 325° F. Where the carbon black to oil weight ratio is less than about 85 to 15, it is preferred that the oil component of the pelleted filler composition have a saturated hydrocarbon content of less than about 30 weight percent thereof. Such oils are presently conventionally employed in the asphalt art as fluxing oils or diluents and in the rubber compounding art as extenders or processing aids for rubber stocks.

A suitable method by which analysis of the composition of oils and asphalts useful in the practice of the present invention can be achieved is detailed in test procedure ASTM D 2006-70, entitled, "Standard Method of Test for Characteristic Groups in Rubber Extender and Processing Oils by the Precipitation Method." This test method is a modified version of and a direct replacement for the Rostler-Sternberg method originally reported in "Compounding Rubber with Petroleum Products", *Industrial and Engineering Chemistry*, Vol. 41, 1949, pp. 598–608. As defined in the ASTM test procedure, the petroleum oil or asphalt under test is broken down into five distinguishable fractions comprising:

(1) asphaltenes (hereinafter fraction A) — that weight percent of the oil under test which is insoluble in 50 volumes of n-pentane;

(2) polar compounds or nitrogen bases (hereinafter fraction N) — that weight percent of the oil under test which is soluble in pentane and which reacts with cold 85 percent sulfuric acid;

(3) first acidaffins (hereinafter fraction $A_1$) — that weight percent of the oil under test which does not react with cold 85 percent sulfuric acid but which does react with cold concentrated (97–98 percent) sulfuric acid;

(4) second acidaffins (hereinafter fraction $A_2$) — that weight percent of the oil under test which does not react with cold concentrated sulfuric acid but does react with cold fuming (30 percent free $SO_3$) sulfuric acid; and (5) saturated hydrocarbons (hereinafter fraction P) — that weight percent of the oil under test that does not react with cold fuming sulfuric acid.

For the purposes of the present invention each of fractions N, $A_1$ and $A_2$ above are considered to be essentially unsaturated. Accordingly, it is intended that it is the P fraction which should be present in an amount of less than about 30 weight percent of the total in order to satisfy the saturated hydrocarbon content limitation for the petroleum oils useful in the practice of the invention.

In preferred embodiments of the invention, the oils employed will adhere to the compositional relationship, CR:

$$CR = (N + A_1)/(P + A_2)$$

such that the value for CR will fall between 0.2 and 1.7 and even more preferably will fall between 0.4 and 1.4.

Finally, still with respect to the subject of suitable petroleum oils, it is pointed out that many of the extender oils presently employed in asphalt applications are, in fact, low viscosity asphalts of low asphaltene (fraction A) content or are the oils separated from high viscosity asphalts as the "maltene" or pentane soluble fractions thereof. Such asphalt derived oils are, obviously, generally highly compatible with asphalt cements and are normally economically attractive. Accordingly, the use of low viscosity asphalts and maltenes as the oil components of the pelleted reinforcing filler compositions of the invention represents a generally preferred embodiment.

The weight ratio of carbon black to oil in formulating the pelleted filler compositions suitable for use in the improved asphalt cement and concrete compositions of the invention is generally subject to considerable variation within the 100 to 5 and 60 to 40 range previously mentioned. The precise weight ratio of carbon black to oil for any given asphalt cement or asphalt concrete system will generally depend upon such factors as: the particular oils and carbon blacks employed, the particular asphalt cement in which the filler composition is to be dispersed, the nature and extent of improvements or modifications of properties desired in the asphalt cement and/or the asphalt concrete formulated therewith, and the like. Suffice it to say, therefore, that the precise weight ratio of carbon black to oil in any given situation will best be determined by taking all of the above factors into account. One general benefit arising from the practice of my invention resides in the fact that consistency change in an asphalt cement as a function of temperature, known in the asphalt art as temperature susceptibility, is often markedly reduced by incorporation of the pelleted filler compositions described herein: This is particularly true when the oil component of the pelleted reinforcing filler composition comprises less than about 3% by weight of crystalline waxes.

For distinct, but related reasons, two sub-ranges of carbon black to oil weight ratios have been identified as preferred embodiments of the pelleted reinforcing filler compositions useful in the practice of the invention. In the first, where the pelleted reinforcing filler compositions of the invention fall within the carbon black to oil weight ratio range of between about 75 to 25 and 65 to 35, it will generally be found that the pelleted reinforcing filler can be compounded into asphalt cements in the amounts set forth herein without deleterious alteration of the consistency of the starting material asphalt cement as determined by penetration and/or viscosity values thereof. On the other hand, where the starting material asphalt cement is possessed of excessively low viscosity or is of an excessively "tender" nature at high temperatures, the use of pelleted reinforcing filler compositions residing within a higher carbon black to oil weight ratio range of between about 100 to 5 and about 85 to 15 can result in a substantial stiffening effect upon the asphalt cement, particularly at high temperatures, and can thus further result in reinforced asphalt cements and concretes having improved high-temperature paving and pavement properties.

In any case, in order to assure adequate dispersibility of the carbon black in the asphalt cement under conventional asphalt cement and asphalt concrete mixing conditions, it is all-important that the carbon black and oil components of the pelleted reinforcing filler compositions be substantially homogeneously associated with one another prior to incorporation of the pelleted filler into the asphalt cement. Separate incorporation of the carbon black and oil components into the asphalt cement will generally result in marked derogation of at least certain of the benefits and advantages available from the practice of the invention. Said homogeneous association of the oil and carbon black can generally be readily achieved by contacting the fluffy carbon black starting material with at least a portion of the total quantity of oil to be employed under conditions of adequate mixing and agitation. Desirably, said contact of the oil with the carbon black will be achieved by preheating of the oil followed by spraying or atomization thereof onto an agitated bed of the fluffy carbon black.

In the interests of easy handling and shipping it is also important that the carbon black/oil mixture be rendered into a pelleted product having an apparent density substantially above that of the fluffy form of the carbon black. Said pelletization of the fluffy carbon black/oil mixtures can generally be readily achieved by tumbling the mixture of oil and carbon black in a drum for a sufficient period of time to result in the formation of pellets thereof. In the interests of good product quality and optimum ultimate performance in the asphalt cement, it is important that the pelleted reinforcing filler composition have a residue value of no more than about 4 percent by weight thereof. The residue value of a pelleted filler generally relates to the dispersion quality thereof in the intended end-item medium and the test procedure by which this property is determined for purposes of this invention is described more fully hereinafter. It is also desirable that the pelleted reinforcing filler compositions have average pellet crush strength values of less than about 20 grams, which values may be suitably determined by use of the Sweigart Model 5 Pellet Tester, A. L. Sweigart, Technical Service Shop, Borger, Texas. Further, the apparent or "pour" density of the pelleted reinforcing filler compositions should generally be below about 30 lbs/ft$^3$ as determined by the method set forth in ASTM D 1513-60, entitled "Standard Method of Test for Pour Density of Pelleted Carbon Black." Adherence to the above criteria will aid in providing the reinforcing filler composition in a pelleted form which possesses good bulking, handling and non-dusting properties and which, in addition, is readily dispersible in the intended end-item asphalt cement and concrete compositions.

Asphalt cements useful in the practice of the invention are generally any of those asphalt or bituminous binder materials conventionally employed in the production of asphalt concrete paving compositions. Accordingly, the asphalt cements of interest are generally understood by those skilled in the art to comprise non-distillable and high-boiling residues of petroleum fractions consisting of asphaltenes (which are components insoluble in n-pentane). Also included, of course, are asphalt cements which occur naturally as deposits in earth or which are separated from petroleum crude oils by distillation, or from petroluem fractions by various techniques. Suitable asphalt cements are also producible by blending of such petroleum oil fractions with residues separated from other asphalt cements.

The grading of various asphalt cements for use in paving applications is generally based on consistency and is usually referenced to the penetration value of the asphalt cement taken at 77° F by ASTM "Standard Method of Test for Penetration of Bituminous Materials", D 5-65. Alternatively, said grading by consistency may also be accomplished by categorizing the particular asphalt cement under consideration by its viscosity taken at 140° F in accordance with "Standard Method of Test for Absolute Viscosity of Asphalts", ASTM D 2171-66.

Generally speaking, the pelleted filler compositions can be dispersed into the asphalt cement in amounts sufficient to provide a carbon black concentration therein of between about 10 and about 70 weight parts per hundred parts of the asphalt cement. Preferably, however, the improved asphalt cement compositions of the invention will comprise between about 15 and 30 weight parts of the carbon black per 100 parts of the asphalt cement. By adherence to this last-mentioned preferred range, the maintenance of the consistency of the asphalt cement to within its original grade designation is facilitated, particularly where the carbon black to oil weight ratio of the filler composition resides within the 75 to 25 and 65 to 35 range mentioned previously.

Incorporation of the pelleted reinforcing filler composition into the asphalt cement can be achieved in any suitable manner. Further, the pelleted filler composition can be compounded into the asphalt cement, per se, or can be compounded therewith at the time of compounding of the asphalt concrete, in other words, when the mineral aggregate and other mineral fillers are incorporated or invested with the asphalt cement so as to produce the final paving composition. Generally, it will be found convenient to disperse the pelleted reinforcing filler composition into the asphalt cement at the time of compounding of the ultimate asphalt concrete or mortar composition. It is convenient, therefore, to combine the pelleted reinforcing filler composition with the asphalt cement, aggregate and other fillers employing conventional pug mill or similar mixing apparatus as employed in hot-plants, cold mixing facilities or in the so-called "drum-mixing" process wherein moderate heat is employed to liquify the asphalt cement. Another benefit enjoyed by compounding of the pelleted reinforcing filler compositions into the asphalt concrete formulation rather than into the asphalt cement, alone, resides in the fact that the mineral aggregate present can aid materially in fracturing the pellets and dispersing the filler into the asphalt cement matrix. In order to even further facilitate the mixing of the components in compounding of either the asphalt cement or the asphalt concrete, it will, of course, be desired to render the asphalt cement component into liquid form, such as by heating, solvation or emulsification thereof prior to incorporation of the reinforcing filler composition therein.

Thus, the improved asphalt concrete or mortar compositions of the invention comprise, in addition to the asphalt cement and the pelleted reinforcing filler dispersed therein, at least one additional major component, the mineral aggregate. For purposes of the present invention, the term "aggregate" is employed in the conventional sense of the pertinent art to which the invention pertains. Accordingly, the mineral aggregate component will generally comprise mixtures of rock and sand and will often be graded over a range of sizes. The rock component is considered to consist of particles greater in size than a No. 8 sieze while the sand component of the aggregate is considered as having a particle size below a No. 8 sieve and above that of a No. 200 sieve. The following definitions, appearing at page 10 of *The Asphalt Handbook*, April 1965 Edition, The Asphalt Institute, are specifically adopted for the purposes of the present application:

"Aggregate, Coarse. — That retained on the No. 8 sieve."

"Aggregate, Fine. — That passing the No. 8 sieve."

The asphalt concrete or mortar compositions of the invention may also comprise other materials conventionally employed in the production of asphaltic or bituminous concrete paving compositions. For instance, mineral fillers are one such material which, while not specifically required in order to achieve the benefits of the asphalt concrete compositions of the invention, may be found useful and which are specifically mentioned herein for purposes of comparison thereof vis-a-vis the carbon blacks employed as part of the pelleted reinforcing filler compositions of the invention. Mineral fillers are defined in the art, again referring to *The Asphalt Handbook*, supra, page 14, as:

"A finely divided mineral product at least 65 percent of which will pass a No. 200 sieve. Pulverized limestone is the most commonly manufactured filler, although other stone dust, hydrated lime, portland cement, and certain natural deposits of finely divided mineral matter are also used." Additional species of mineral fillers conventionally employed in asphalt concrete compositions are disclosed in ASTM D 242-70 entitled, "Standard Specification for Mineral Filler for Bituminous Paving Mixtures", and include slag dust, fly ash and loess. The mineral fillers are readily distinguishable from the carbon blacks employed in the compositions of the invention by their generally relatively low BET-$N_2$ surface areas of less than 30 m²/g, their lack of elemental carbon, and the fact that they are generally hydrophilic and lipophobic. The carbon blacks employed in the compositions of the present invention, however, are characterized by relatively high BET-$N_2$ surface areas, by their almost pure elemental carbon composition and by the fact that they are relatively hydrophobic and lipophilic.

The relative proportions of aggregate and asphalt cement forming the basic asphalt concrete compositions of the invention are susceptible of wide variation within conventional art recognized limits. While little criticality attaches to the proportioning of aggregate and asphalt cement in the practice of the invention, guidelines pertaining to such proportioning are contained in Manual on Design and Construction of Asphalt Roads and Streets, the Asphalt Institute, Pacific Coast Division, 1952. Therein, at page 67, there is given the formula:

$$P = (R\,4 + S\,7 + F\,12)\,C$$

wherein P represents the percentage, by weight, of asphalt cement to be employed; R represents the percentage of rock; S represents the percentage of sand; F represents the percentage of silt and C is a constant dependent upon local conditions.

Another formula for estimating asphalt cement requirements is given in the *Asphalt Institute Manual No. 14*, "Asphalt Mixed-in-Place (Road-Mix) Manual" (MS-14) on pages 9 and 10:

$$p = 0.02a + 0.07b + 0.15c + 0.20d$$

wherein $p$ = Percent of asphalt material by weight of dry aggregrate $a$ = Percent of mineral aggregrate retained on No. 50 sieve $b$ = Percent of mineral aggregrate passing No. 50 and retained on No. 100 sieve $c$ = Percent of mineral aggregrate passing No. 100 and retained on No. 200 sieve $d$ = Percent of mineral aggregate passing the No. 200 sieve There follow a number of examples which are given to illustrate various preferred embodiments of the invention and to exemplify several of the advantages and benefits accruable thereto. Accordingly, the examples forming part hereof are specifically intended to be illustrative in nature and are not to be construed as limiting of the invention.

PREPARATION OF SAMPLES AND TEST METHODS

Asphalt/Sand Mix Sample Preparation

The laboratory procedure employed was designed to simulate typical mixing conditions in the asphalt paving industry. Said procedure consists of simple hand-mixing for three to six minutes of 100 parts by weight of +30-20 sieve analysis Ottawa sand with 2 parts by weight of the asphalt cement, these ingredients being preheated and maintained during mixing at a temperature of about 325° F. Where pelleted reinforcing fillers are employed, they are added in the stated amounts, prior to the mixing of the asphalt cement and sand.

Pellet Abrasion Test

Briefly, this test entails the preparation of cylindrical test specimens of known weight from the asphalt/sand mix sample prepared in accordance with the preceding procedure. A weighed two gram (±0.1 gram) of the asphalt/sand mix sample is placed in a ½ inch diameter pellet mold and a pressure of about 1000 p.s.i. is exerted on the asphalt/sand mix contained therein for a period of about 1 minute. The resulting cylindrical specimen is loaded into a French square bottle of 16 ounce capacity and the bottle is then continuously rotated about its longitudinal axis at a constant speed of 87.5 revolutions per minute and at a predetermined controlled temperature. After 500 revolutions the major portion of the specimen remaining is removed and weighed or, alternatively, total disintegration of the specimen signals the conclusion of the test. The calculation employed relates the weight loss of the specimen as a function of the number of revolutions required to effectuate said weight loss and is, accordingly, expressed in terms of weight loss (milligrams) per complete revolution of the bottle. A complete disclosure of this test procedure may be had by reference to "Properties of Highway Asphalts III", Halstead, Rostler and White, *Public Roads*, Vol. 34, No. 2, pages 17 ff, June 1966.

Asphalt Concrete Toughness

This property of asphalt concretes is determined by accomplishing the Pellet Abrasion Test, defined hereinabove, over a range of temperatures. In essence, the Pellet Abrasion Test measures the impact resistance of the specimen and is indicative of the toughness of the asphalt concrete or mortar under consideration. This is particularly true when asphalt/sand mix samples of a given composition are subjected to the Pellet Abrasion Test at different temperatures after aging under specified conditions.

Asphalt Cement Sample Preparation

In order to determine residue values of pelleted reinforcing filler compositions employed, penetration values and temperature susceptibility properties, asphalt cement sample compositions are prepared in which no mineral aggregate is present. Preparation of such samples is achieved by blending of the listed ingredients of the sample mixes for a period of about 5 minutes in a Waring Blendor equipped with means to heat the contents of the bowl thereof. The asphalt cement component of each sample mix is preheated to about 325° F and the bowl of the blendor is heated so as to maintain the contents thereof at about 325° F throughout the mixing cycle.

Penetration Value

The procedure employed in this determination is set forth in ASTM D 5-65, the specific needle weights and penetration times employed being listed against the samples undergoing test.

Temperature Susceptibility

This property of an asphalt cement sample is determined by carrying out penetration value analyses, in accordance with the above procedure, at three sample temperatures: 39.2° F, 77° F and 90° F.

Residue Value Test

As mentioned previously, the residue value of a pelleted reinforcing filler is considered to be broadly indicative of its dispersion properties in the enditem matrix thereof, in this case said matrix being a particular asphalt cement. Accordingly, for the residue value determination an asphalt cement sample is prepared in accordance with the above-described procedure and wherein the asphalt cement employed is "Boscan" asphalt having a 77° F penetration value of 64. The quantity of pelleted reinforcing filler employed in preparing the asphalt cement sample is 10 weight parts of said filler per 100 weight parts of the asphalt cement. An aliquot of a known quantity of the thusly prepared asphalt cement sample is washed through a No. 325-mesh sieve (ASTM E 11-70) employing petroleum naphtha as the solvent. The matter retained on the sieve is considered to be "residue" and is dried at about 110° F for about 15 minutes and weighed. The residue value for a pelleted reinforcing filler is expressed as the percent of residue by weight of the pelleted filler content of the washed asphalt cement sample.

EXAMPLE 1

Pelleted reinforcing filler compositions of the invention are employed in the preparation of two reinforced asphalt cement compositions comprising different grades of asphalt cement. Penetration values and temperature susceptibility properties of the sample asphalt cement compositions are compared against control asphalt cements containing no reinforcing filler. Pertinent compositional and performance data appear in Table I hereof.

It is noteworthy that the reinforced asphalt cement compositions of the invention are clearly shown to have penetration values, at both 39.2° F and 90° F temperature conditions, substantially closer to their 77° F values than those of the unmodified asphalt cement controls. The relatively lower temperature susceptibilities displayed by the asphalt cement compositions of the invention can be beneficial in compounding of asphalt concrete paving compositions therewith and in the laying of the resulting asphalt concrete pavements.

TABLE I

| Asphalt Cement Composition Sample No. | | 1 Control | 2 | 3 Control | 4 |
|---|---|---|---|---|---|
| Asphalt, 60–70 penetration grade at 77° F (parts by weight) | | 100 | 100 | — | — |
| Asphalt, 85–100 penetration grade at 77° F (parts by weight) | | — | — | 100 | 100 |
| Pelleted reinforcing filler composition having a residue value of 0.06 wt % and consisting of a mixture of 85 parts by weight ECF carbon black[1] and 15 parts by weight of Oil S[2] (parts by weight) | | — | 31 | — | — |
| Pelleted reinforcing filler composition consisting of a mixture of 88 parts by weight ECF carbon black[1] and 12 parts by weight of Oil S[2] (parts by weight) | | — | — | — | 20 |
| Penetration, ASTM D 5-65 | 39.2° F, 200 g., 60 sec. | 20 | 38 | 27 | 47 |
| | 77° F, 100 g., 5 sec. | 63 | 65 | 100 | 97 |
| | 90° F, 50 g., 5 sec. | 96 | 82 | 153 | 131 |

[1]An electrically conductive fluffy furnace carbon black, Vulcan XC-72R, having a BET-$N_2$ of 220 m$^2$/g. and a DBP absorption value of 230 c.c./100 g.
[2]A high-boiling petroleum solvent having the following composition (weight percent): A = O; N = 5.8; $A_1$ = 31.8; $A_2$ =49.4; P = 13.0; $N+A_1/P+A_2$ = 0.60

EXAMPLE 2

A number of sample carbon black/oil reinforcing compositions are formulated by agitating a bed of the fluffy form of the carbon black while spraying thereinto the oil. The carbon black employed is an HAF type fluffy furnace black, Elftex 5, produced by Cabot Corporation, Boston, Massachusetts, having a BET-$N_2$ surface area of about 74 m$^2$/g and a dibutyl phthalate absorption value of about 140 c.c./100 g. Various oils are employed and are fully identified in Table II. In each instance, the sample reinforcing composition consists of 65 parts by weight of the carbon black and 35 parts by weight of the oil. Next, each of the carbon black/oil samples is rendered into pelleted form by drum tumbling thereof.

Asphalt/sand mix sample compositions are prepared in the manner disclosed hereinbefore wherein 0.5 part by weight of the pelleted carbon black/oil reinforcing compositions are incorporated into 2 parts by weight of the asphalt cement and 100 parts by weight of the Ottawa sand aggregate, thereby to provide sample asphalt/sand mix compositions comprising about 16 parts of carbon black per 100 parts of the asphalt cement. The asphalt cement employed throughout is a "Valley" asphalt having a penetration value of 58 at 77° F. Additionally, control asphalt/sand mix compositions are prepared (1) wherein no reinforcing filler is employed, and (2) wherein said reinforcing filler consists of a commercially available oil-free pelleted HAF carbon black, Vulcan 3.

Specimen pellets are then formed from each of the sample asphalt/sand mix compositions and said pellets are then subjected to pellet abrasion and toughness analyses in accordance with the procedures discussed in detail hereinabove. The data resulting from said analyses are set forth in Table II below.

In addition, pellet hardnesses, apparent densities and residue values for the pelleted reinforcing fillers are determined in accordance with the procedures previously described and these values are also set forth in said Table II.

cement components therefor. The reinforcing filler composition employed in the present Example is a pelleted mixture consisting of 67 parts by weight of the fluffy oil furnace HAF carbon black identified in Example 2 and 33 parts by weight of Oil C, also identified in Example 2. Asphalt cement "V" is a "Valley" asphalt having a 77° F penetration value of 58. Asphalt "B" is a "Boscan" asphalt having a 77° F penetration value of 64. Asphalt cement "A" is an "Arkansas" asphalt having a 77° F penetration value of 65. Asphalt cement "C" is a "Canadian" asphalt having a 77° F penetration value of 63. More complete details concerning the physical and chemical properties of these specific asphalt cements may be had by reference to *Report No. FHWA-RD-72-18*, "Fingerprinting of Highway Asphalts: A Method for Cataloging and Identifying Asphalts", F. S. Rostler and K. S. Rostler, November 1971. Said report is available to the public through the National Technical Information Service, Springfield, Virginia 22151. The asphalt/sand mix compositions are subjected to pellet abrasion analyses and the results thereof, which include comparisons against similar asphalt/sand mix compositions containing no reinforcing fillers and slightly higher quantities of asphalt cement in order to compensate for the absent filler volumes, are presented in Table III below.

TABLE III

| Test Specimen | Carbon Black/Oil Filler g/100g Sand | Asphalt Cement g/100g Sand | Abrasion Loss, mg/revolution | | | |
|---|---|---|---|---|---|---|
| | | | at 50° F | | at 77° F | |
| | | | Unaged | Aged 7 days | Unaged | Aged 7 days |
| V (Valley Control) | — | 2 | 11.0 | 23.8 | 0.60 | 3.40 |
| V | 0.43 | 1.70 | 5.89 | 8.37 | 0.46 | 2.83 |
| B (Boscan Control) | — | 2 | 8.95 | 32.9 | 1.43 | 4.77 |
| B | 0.43 | 1.70 | 4.07 | 13.1 | 0.84 | 2.52 |
| A (Arkansas Control) | — | 2 | 3.14 | 3.45 | 0.007 | 0.049 |
| A | 0.43 | 1.70 | 2.26 | 3.66 | 0.007 | 0.016 |
| C (Canadian Control) | — | 2 | 6.87 | 14.2 | 0.64 | 2.37 |
| C | 0.43 | 1.70 | 4.21 | 10.1 | 0.09 | 1.07 |

EXAMPLE 4

In the present Example there is employed as the reinforcing filler material an oil pelleted carbon black hav-

TABLE II

| | REINFORCING FILLER composition | | | | ABRASION LOSS, mg./rev. | | | |
|---|---|---|---|---|---|---|---|---|
| Sample No. | | Residue Value (wt %) | Avg. Pellet Hardness (gms) (Sweigart) | Pour Density lb/ft³ (ASTM D 1513-60) | at 50° F | | at 77° F | |
| | | | | | Unaged | Aged 7 days | Unaged | Aged 7 days |
| 1 | None (Control) | — | — | — | 14.7 | 42.3 | 1.24 | 3.66 |
| 2 | HAF Pellets (Control) | 23.9 | 27 | 22 | 33.6 | 56.3 | 3.28 | 8.91 |
| 3 | 65 parts HAF/35 parts Oil C[(1)] Pellets | 2.67 | 5.2 | 26 | 3.41 | 5.37 | 0.13 | 0.96 |
| 4 | 65 parts HAF/35 parts Oil IIC[(2)] Pellets | 1.75 | 18.1 | 26.9 | 5.03 | 8.84 | 0.44 | 0.90 |
| 5 | 65 parts HAF/35 parts Oil FS-B[(3)] Pellets | 1.51 | 11.3 | 26.4 | 5.38 | 13.6 | 0.25 | 1.73 |
| 6 | 65 parts HAF/35 parts Oil 790[(4)] Pellets | 3.36 | 12.4 | 28.1 | 4.10 | 10.1 | 0.37 | 1.32 |

[(1)] An extender oil, ASTM D 2226, Type 101, having the following composition (weight percent): A = O; N = 17.1; $A_1$ = 19.9; $A_2$ = 49.7; P = 13.3; $N+A_1/P+A_2$ = 0.59.
[(2)] A low viscosity asphalt having the following composition (weight percent): A = 1.2; N = 17.7; $A_1$ = 20.1; $A_2$ = 48.1; P = 12.9; $N+A_1/P+A_2$ = 0.62.
[(3)] A petroleum oil conventionally employed as feedstock in the preparation of oil furnace carbon blacks and having the composition (weight percent): A = O; pentane insoluble non-asphaltenes = 5.4; N = 17.4; $A_1$ = 44.2; $A_2$ = 21.6; P = 11.4; $N+A_1/P+A_2$ = 1.87.
[(4)] An extender oil, ASTM D 2226, Type 102, having the following composition (weight percent): A = O; N = 9.8; $A_1$ = 18.0; $A_2$ = 50.7; P = 21.5; $N+A_1/P+A_2$ = 0.38.

EXAMPLE 3

In the present Example several sample asphalt mortar compositions containing the reinforcing fillers of the invention are produced employing different asphalt ing a carbon black to oil weight ratio of about 95:5, an apparent density of 15.9 lbs/ft³, an average pellet strength of about 9 gms and a residue value of less than about 4 weight percent. The carbon black component is an HAF furnace carbon black having a BET-$N_2$ surface area of about 74 $m^2/g$ and a DBP absorption value of about 148 c.c/100 g. The oil component of the reinforcing filler composition is Coray 40, a naphthenic base oil refined by Humble Oil and Refining Company, Houston, Texas.

In accordance with the procedures set forth previously, several asphalt cement samples are prepared containing the abovespecified reinforcing filler in various quantities. The starting material asphalt cements are various grades of San Joaquin Valley asphalts. In Table IV, following, there are presented data comparing rheological and softening point properties of the reinforced asphalt cement samples against those of the starting material asphalt cements.

were subjected to water immersion at a temperature of 140° F for a period of about 24 hours prior to the compressive strength testing thereof. In Table V, following, there appear cohesion and compressive strength data comparing the filler-containing specimens prepared in accordance with the above procedure against control specimens wherein no reinforcing filler is employed.

TABLE V

| ASPHALT CONCRETE COMPOSITION | | | | | | |
|---|---|---|---|---|---|---|
| Aggregate, granite ½ inch max., dense-graded (weight parts) | 100 | 100 | 100 | 100 | 100 | 100 |
| Valley AR-1000 asphalt cement (weight parts) | 5.5 | 5.5 | — | — | — | — |
| Valley AR-2000 asphalt cement (weight parts) | — | — | 5.5 | 5.5 | — | — |
| Valley AR-4000 asphalt cement (weight parts) | — | — | — | — | 5.5 | 5.5 |
| Oil-pelleted carbon black (weight parts) | — | 0.82 | — | 0.82 | — | 0.82 |
| Carbon black content (parts per 100 parts by weight of asphalt cement) | — | 14.25 | — | 14.25 | — | 14.25 |
| ASPHALT CONCRETE PROPERTIES | | | | | | |
| Cohesion (ASTM 1560-65) Hveem Cohesiometer Value | 120 | 188 | 163 | 206 | 185 | 275 |
| Compressive Strength, dry, unconfined, ASTM D 1074, p.s.i. | 391 | 450 | 630 | 617 | 538 | 803 |
| Compressive Strength, after 24 hours water immersion at 140° F, unconfined, ASTM D 1075, p.s.i. | 137 | 237 | 179 | 324 | 238 | 374 |
| Wet Compressive Strength as percent of Dry Compressive Strength | 35 | 53 | 28 | 53 | 44 | 47 |

Obviously, many changes may be made in the above description and Examples without departing from the intended spirit and scope of the invention. For instance, prior to or during compounding of the asphalt cement or asphalt concrete compositions of the invention additional amounts of fluxing oils may be separately added in order to modify the overall properties of the cement or concrete product. Also, fillers other than those spe-

TABLE IV

| Asphalt Cement | Oil/Carbon Black Pellets (parts per 100 of asphalt cement) | Penetration 39.2° F 200 g 60 sec. | Penetration 77° F 100 g 5 sec. | Softening Point ASTM D 36-70 (° F) | Viscosity at 140° F ASTM D 2171-66 (P) |
|---|---|---|---|---|---|
| Valley AR-1000 | None | 38 | 131 | 110.0 | 603 |
| Valley AR-1000 | 15 (by weight) | 33 | 99 | 115.5 | 1,497 |
| Valley AR-1000 | 30 (by weight) | 27 | 69 | 150.6 | 21,740 |
| Valley AR-2000 | None | 19 | 73 | 116.6 | 1,364 |
| Valley AR-2000 | 15 (by weight) | 18 | 58 | 125.1 | 3,480 |
| Valley AR-2000 | 30 (by weight) | 15 | 43 | 149.7 | 49,800 |
| Valley AR-4000 | None | 17 | 58 | 118.6 | 2,279 |
| Valley AR-4000 | 15 (by weight) | 16 | 47 | 128.1 | 5,400 |

Next, using the oil pelleted carbon black reinforcing filler and asphalt cement starting materials described above, there are produced sample asphalt concretes, each comprising a mix of ½ inch maximum dense-graded granite aggregate, 5.5 parts of asphalt cement per 100 parts by weight of the aggregate and 15 parts of the reinforcing filler per 100 parts by weight of the asphalt cement. From each of the thusly prepared asphalt concrete mixes there are molded several specimen cylinders for subsequent testing in accordance with ASTM D 1560-65 and ASTM D 1074. Certain of the specimens cifically mentioned above can be added to the asphalt concrete compositions of the invention during formulation thereof in order to impart various desirable properties thereto. Accordingly, mineral fillers, graded and ungraded aggregates, polymeric binders, elastomeric modifiers, asbestos fiber, surfactants, aging retarders and the like can each generally form part of the asphalt cement and concrete compositions of the invention.

Thus, the embodiments specifically described hereinbefore are to be considered in all respects as illustrative and not limiting, and all changes coming within the meaning and equivalency range of the appended claims are intended to be embraced therein.

What is claimed is:

1. A filler composition for asphalt which comprises a pelleted mixture of carbon black having a BET-$N_2$ surface area of at least about 40 m$^2$/g and a dibutyl phthalate absorption value of at least about 60 c.c./100 g and an essentially nonvolatile asphalt-solvating oil, the weight ratio of said carbon black to said oil being between 90 to 10 and 60 to 40; said pelleted mixture having a 325-mesh residue value, as determined by the Residue Value Test procedure described herein, of not more than about 4 weight percent thereof, and which pelleted mixture, when dispersed into 100 parts by weight of +30−20 sieve analysis Ottawa sand and 2 parts by weight of asphalt cement by hand stirring of the combined ingredients for from three to six minutes at a temperature of about 325° F, results in an improved asphalt composition having reduced pellet abrasion properties as determined by the Pellet Abrasion Test procedure described herein.

2. The filler composition of claim 1 wherein the residue value of the pelleted mixture is between 0.06 and 3.36 weight percent thereof.

3. The filler composition of claim 1 wherein the pelleted mixture has an average pellet strength of less than about 20 gms.

4. The filler composition of claim 1 wherein the pelleted mixture has an apparent density of less than about 30 lbs/ft$^3$.

5. The filler composition of claim 1 wherein the weight ratio of carbon black to oil is between 75 to 25 and 65 to 35.

6. The filler composition of claim 1 wherein the carbon black has a BET-$N_2$ surface area of at least about 70 m$^2$/g.

7. The filler composition of claim 1 wherein the carbon black has a dibutyl phthalate absorption value of at least about 100 c.c./100 g.

8. The filler composition of claim 1 wherein the oil has an asphaltene content of less than about 5 weight percent thereof.

9. The filler composition of claim 1 wherein the oil is chosen from the group consisting of maltenes, low viscosity asphalts and mixtures thereof.

10. The filler composition of claim 1 wherein the oil has a compositional relationship, defined by the equation:

$$CR = (N+A_1)/(P+A_2)$$

where CR is the compositional relationship; N is the weight percent of polar compounds; $A_1$ is the weight percent of first acidaffins; $A_2$ is the weight percent of second acidaffins and P is the weight percent of saturated hydrocarbons of between 0.2 and 1.7.

11. The filler composition of claim 1 wherein CR is between 0.4 and 1.4.

12. An asphalt cement composition comprising asphalt cement having dispersed therein a filler composition comprising a pelleted mixture of carbon black having a BET-$N_2$ surface area of at least about 40 m$^2$/g and a dibutyl phthalate absorption value of at least about 60 c.c./100 g and an essentially nonvolatile asphalt-solvating oil, the weight ratio of carbon black to oil being between 100 to 5 and 60 to 40, said pelleted mixture having a residue value, as determined by the Residue Value Test described herein, of not more than about 4 weight percent thereof, and the amount of said filler composition dispersed in said asphalt cement being sufficient to provide between about 10 and about 70 parts by weight of said carbon black per one hundred parts of said asphalt cement.

13. The asphalt cement composition of claim 12 wherein the weight ratio of carbon black to oil in said filler composition is between 75 to 25 and 65 to 35.

14. The asphalt cement composition of claim 13 wherein the amount of said filler composition dispersed in said asphalt cement is sufficient to provide between about 15 and about 30 parts by weight of carbon black per one hundred parts of said asphalt cement.

15. The asphalt cement composition of claim 12 wherein the weight ratio of carbon black to oil in said filler composition is between 100 to 5 and 85 to 15.

16. The asphalt cement composition of claim 12 wherein said carbon black has a BET-$N_2$ surface area of at least about 70 m$^2$/g.

17. The asphalt cement composition of claim 12 wherein said carbon black has a dibutyl phthalate absorption value of at least about 100 c.c./100 g.

18. The asphalt cement composition of claim 12 wherein said oil has an asphaltene content of less than about 5 weight percent thereof.

19. The asphalt cement composition of claim 12 wherein, in said filler composition, the weight ratio of carbon black to oil is less than about 85 to 15 and wherein said oil comprises less than about 30 percent by weight thereof of saturated hydrocarbons.

20. The asphalt cement composition of claim 12 wherein said oil is chosen from the group consisting of maltenes, low viscosity asphalts and mixtures thereof.

21. The asphalt cement composition of claim 12 wherein said oil has a compositional relationship, defined by the equation:

$$CR = (N+A_1)/(P+A_2)$$

where CR is the compositional relationship; N is the weight percent of polar compounds; $A_1$ is the weight percent of first acidaffins; $A_2$ is the weight percent of second acidaffins and P is the weight percent of saturated hydrocarbons of between 0.2 and 1.7.

22. The asphalt cement composition of claim 12 wherein CR is between 0.4 and 1.4.

23. An asphalt concrete composition comprising a mixture of asphalt cement and mineral aggregate, said asphalt cement having dispersed therein a filler composition comprising a pelleted mixture of carbon black having a BET-$N_2$ surface area of at least about 40 m$^2$/g and a dibutyl phthalate absorption value of at least about 60 c.c./100 g and an essentially non-volatile asphalt-solvating oil, the weight ratio of said carbon black to said oil being between 100 to 5 and 60 to 40, said pelleted mixture having a residue value, as determined by the Residue Value Test disclosed herein, of not more than about 4 weight percent thereof and the amount of said filler composition dispersed in said asphalt being sufficient to provide between about 10 and about 70 parts by weight of said carbon black per one hundred parts of said asphalt cement.

24. The asphalt concrete composition of claim 23 wherein the weight ratio of carbon black to oil in said filler composition is between 75 to 25 and 65 to 35.

25. The asphalt concrete composition of claim 23 wherein the weight ratio of carbon black to oil in said filler composition is between 100 to 5 and 85 to 15.

26. The asphalt concrete composition of claim 23 wherein said carbon black has a BET-$N_2$ surface area of at least 70 $m^2/g$ and a dibutyl phthalate absorption value of at least 100 c.c./100 g.

* * * * *